March 14, 1939.  R. J. KEMP  2,150,551
DIRECTION FINDING SYSTEM
Filed Jan. 21, 1936
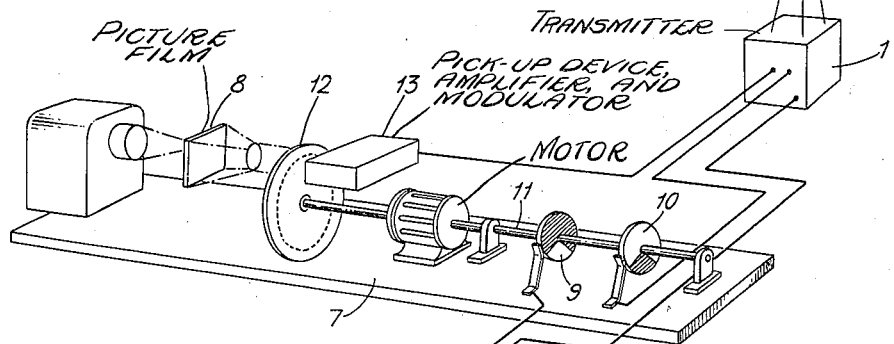
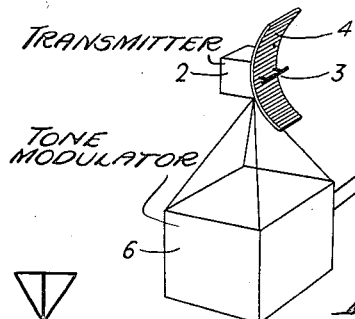
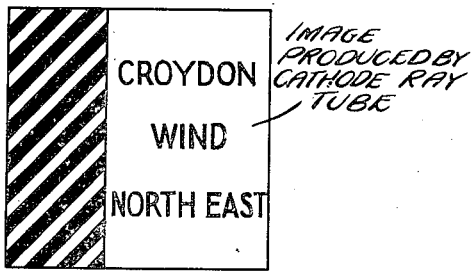
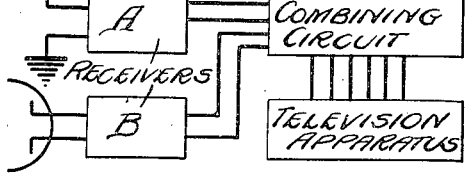
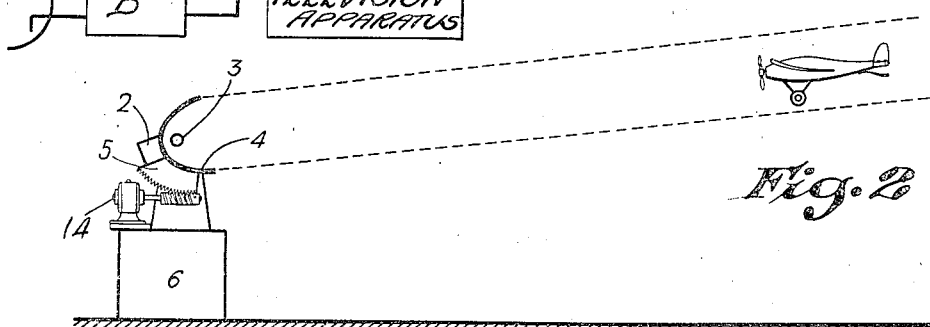
INVENTOR.
ROLAND JOHN KEMP
BY
ATTORNEY.

Patented Mar. 14, 1939

2,150,551

UNITED STATES PATENT OFFICE 2,150,551

DIRECTION FINDING SYSTEM

Roland John Kemp, Chelmsford, England, assignor to Radio Corporation of America, a corporation of Delaware Application January 21, 1936, Serial No. 60,014
In Great Britain January 25, 1935

7 Claims. (Cl. 250—11)

This invention relates to navigation aiding wireless systems for use in connection with aircraft.

As is well known, a serious operating difficulty in connection with aircraft arises when an aircraft is required to land under conditions of bad visibility—for example in fog—and various wireless navigation aiding systems have been proposed in order to assist the pilot of an aircraft to land his machine even when the conditions of visibility are so bad that the ground cannot be seen until the machine is extremely close. Navigation aiding systems as at present known are commonly used to enable the pilot to steer a proper course to the landing ground. At low altitudes, however, say altitudes of 100 feet or less, such systems do not give the pilot accurate indication of his actual height or of his exact distance from the landing point and consequently the gliding angle of the aircraft during its final travel coming in to land must be judged more or less by guess work, with the result that a very high degree of experience and skill on the part of the pilot is necessary.

The object of the present invention is to provide a navigation aiding system suitable for use for assisting aircraft to land while "flying blind" and which is capable of informing the pilot of the gliding angle he should choose for making a landing and to assist him in maintaining a correct gliding angle until his machine actually lands, so that he is required to exercise only normal navigating skill in order to make a safe landing even in fog.

According to this invention a navigation aiding wireless installation comprises means for projecting a sharply directional radio beam, means for swinging the said beam up and down so as to vary its angle of inclination with the ground and means for characterizing said radiated beam differently for different angles of inclination. Thus the pilot of a machine equipped with a suitable radio receiver will, by reason of the particular characterization of the signal he receives when the directional beam is incident upon his machine, be informed of the angle of that beam with respect to the ground.

Preferably characterization of the directional radio beam is effected by different modulating frequencies and preferably also the transmitting installation upon the ground includes in addition to the means for projecting the vertically swinging directional beams, means for radiating omni-directional radiation modulated with suitable information of an identifying and informative nature, for example, the name of the aerodrome and the direction of the wind.

In the preferred embodiments of this invention the necessary informative information is conveyed to the pilot visually, that is to say the machine is equipped with a television reproducer so constructed and arranged as to reproduce a picture part of which corresponds with the modulation which is omni-directionally transmitted and the remainder of which (this remainder appearing when the directional radiation is received) consists of a pattern or picture determined by the modulation upon the directional beam and characteristic of the inclination of that beam.

One embodiment of my invention is illustrated in the accompanying drawing, in which Figure 1 shows schematically certain apparatus useful in practicing the invention;

Fig. 2 illustrates a method of operation;

Fig. 3 shows the form in which a characteristic indication may be made for the guidance of an air pilot; and, Fig. 4 shows schematically a suitable receiving circuit arrangement including television apparatus for carrying out the invention.

Referring to Fig. 1, I show the apparatus included in a transmitting installation in accordance with the invention. The said installation comprises an omni-directional radio transmitter 1 operating, for example, at a wave length of 9 meters and a sharply directional very short wave radio beam transmitter 2 operating, for example, upon a wave length of 50 cm. The beam transmitter may be of any well known form; for example it may comprise (as shown) a dipole aerial 3 at the focus of a parabolic reflector 4. Means (not shown in Fig. 1) are provided for swinging the beam up and down through a predetermined arc, the direction of swing being along a vertical plane. This swinging action may be accomplished in any known way, for example, as shown diagrammatically in the accompanying Fig. 2, by swinging the reflector and aerial unit itself by means of a quadrant 5 and a suitable chain of gears driven by an electric motor 14 the field of which is reversed by switches which are operated when the swinging unit reaches the ends of its traverse. The very short wave radio beam transmitted is modulated by tone frequencies, the tone frequencies being applied at predetermined times during the swings so that the tone frequency modulation at any time is characteristic of the inclination of the beam at that time. For example when the beam is horizontal a 50 cycle modulation may be applied; at 5° above horizontal a 100 cycle modulation may be applied; at 10° above horizontal a 200 cycle modulation may be applied and so on. The tone modulation equipment is represented schematically at 6.

The omni-directional transmitter 1 is modulated by means of television transmitting apparatus designated generally by the reference number 7 with signals corresponding to a picture 8 identifying the aerodrome and conveying other desired information and modulation of the two transmitters is interlocked, for example by means of rotary contact devices 9, 10, mounted on the motor shaft 11 driving the scanning disc 12 of the television apparatus 7 in such manner that when the omni-directional transmitter is modulated the directional transmitter is not and vice versa. The apparatus for converting variations in light and shade in the picture 8 into current impulses and for amplifying said impulses for modulation of the transmitter 1 may be of any well known kind and is represented schematically at 13.

The modulation transmitted omni-directionally may consist of a picture comprising the name of the aerodrome in block capitals and other words conveying, for example, information as to wind direction. This modulation is such that when reproduced in the form of a picture upon a suitable television reproducer on the aircraft the reproduction does not occupy the whole area of the picture reproducer screen but only a part thereof, as shown for example in the accompanying Fig. 3. For example, suppose the television system is such as to scan a picture area 15 times per second at 50 lines per picture; then television modulation of the omni-directional radiation might be arranged not to commence until the beginning of the 20th scanning line of each picture and to terminate at the 50th scanning line thus leaving 20 scanning lines of the total picture area blank. In this case the devices 9, 10, which constitute a distributing commutator are inter-connected with the omni-directional transmitter and the beam transmitter in such manner that during the "blank" 20 lines per picture, the omni-directional transmitter has zero modulation while during the remainder of the lines per picture the beam transmitter has zero modulation.

The picture 8 may be in the form of a template with transparent letters an image of which is focussed upon the Nipkow disc 12 or other suitable scanning apparatus so as to give picture signals corresponding to the words or other picture matter upon the template the said picture signals being transferred to the omni-directional transmitter to modulate the same.

Modulation of the beam transmitter is effected by a series of frequency generators (not shown) in such manner that the tone frequency transmitted at any particular time is in correspondence with the angle of inclination of the beam at that time.

An aircraft for cooperation with this system is equipped with two radio receivers one for receiving the 9 meter transmission and the other the 50 cm. transmission and the modulation outputs from these two receivers are combined and fed to a television reproducer which will thus reproduce a total picture made up in part of the words or other picture matter omni-directionally transmitted and in part of a pattern corresponding to the particular tone frequency which has been received. This pattern will, as shown at the left hand side of the viewing screen of the cathode ray tube (Fig. 3) consist of a series of oblique shaded bars. The number and slope of these bars will depend upon a frequency relationship between the tone modulation as determined by the transmitter 2 for different slopes of the beam, and the scanning line frequency of the television apparatus which responds to an omni-directional signal sent out by the transmitter 1 (Fig. 1). The angle of slope of the modulated beam at the time it strikes the aircraft receiver, is related to the tone frequency by which that beam is modulated. The light and dark areas along a given scanning line will, therefore, vary in length, since the scanning line frequency remains constant. The oblique bar pattern may, therefore, be correlated with respect to the slope of the beam so as to enable an aircraft pilot to determine his position and the necessary angle of glide for making a landing. The television reproducer upon the aircraft may be of any conventional form as known in the art, and may be controlled as aforesaid by two receivers A and B working into a combining circuit and thence into a suitable television image producing apparatus, such as a cathode ray tube. Fig. 4 illustrates conventionally such an arrangement where the receiver A is fed with energy of the omni-directional signal including synchronizing impulses, while receiver B is fed preferably with energy of the focussed beam as derived from the beam transmitter 2.

A pilot desiring to land at an aerodrome in fog would accordingly act in pursuance of the following procedure:—

The aircraft on approaching the aerodrome would first receive the omni-directional transmission and this would maintain the television receiver in synchronism and cause a picture to be reproduced, this picture consisting of the omni-directionally transmitted information together with a blank portion. The aircraft would then follow a circular course round the aerodrome until it received the directional beam transmitted by the very short wave transmitter whereupon the blank portion of the picture would be filled in by a portion whose nature would inform the pilot of the angle of glide to adopt in order to come in to land. The pilot would choose his gliding angle accordingly and steer a course to earth by following this angle as indicated in Fig. 2.

In the specific embodiment above described the directional beam is described as modulated by tone frequencies. This method of modulation is chosen because in the present stage of development of ultra short wave radio technique it is difficult practically to transmit complex modulation. The invention is, however, not limited to the use of tone frequency modulation since from the practical navigation point of view, it would be preferable to make the modulation of the directional beam such as to cause picture reproduction of words actually stating the required angle of glide; in other words, it is preferred, where practical considerations allow of it, to resort to picture modulation of the directional beam instead of merely tone frequency modulation, the picture modulation consisting of words characteristic of and stating the angle of beam at any time.

I claim:

1. A navigation aiding wireless installation comprising means for projecting a sharply directional radio beam, means for swinging said beam up and down so as to vary its angle of inclination with the ground, means for modulating said radiated beam differently for different angles of inclination, and receiving means having an image producing device responsive to the modulations impressed on said beam for displaying an image composed of oblique bands of contrasting shades, said bands being indicative of the slope of the intercepted radio beam.

2. In a wireless system of the class described, means for omni-directionally radiating modulated waves of a given frequency, means synchronously cooperating with the first said means for directionally radiating a beam of ultra-high frequency energy, means for cyclically varying the angle of inclination of the axis of said beam with respect to the ground plane, means for characteristically modulating the energy of said beam with different signals at different angles of inclination, a receiver responsive to said omni-directional waves, another receiver responsive to said directionally radiated beam, and television apparatus jointly operable by said receivers for producing an image in conformity with the modulations of said omni-directional waves and said beam respectively, the image formation in respect to the modulations of said beam being indicative of the slope of said beam when it is intercepted by the appropriate one of said receivers.

3. A system in accordance with claim 2 and comprising means for characterizing the signals by which the omni-directional radiation is modulated with information of a nature such as to identify the source of the radiation and with other intelligence.

4. A system in accordance with claim 2 and further characterized in that the omni-directional radiating means is provided with further means for emitting television signals adapted to give a visual indication to the pilot of an aircraft within range of the signals, said indication being such as to be of guidance as to the name of the aerodrome from which the signals originate and as to the direction of the wind.

5. A system in accordance with claim 2 and including means for modulating the energy emitted by the omni-directional radiation source and by the directional beam source intermittently and alternately.

6. A television radio system adapted for use in aerial navigation comprising means for projecting an image of the name of the sending station together with an image constituting other intelligence to be radiated omni-directionally, television scanning means adapted to translate said images into a train of impulses, an omni-directional radiating device, means for modulating energy impressed upon said device with said train of impulses, means including a directional beam transmitter operatively coordinated with the scanning and translating means, means for so dividing the picture framing period that the omni-directional radiation is modulated for a predetermined number of scanning lines of the picture framing period and said directional beam is modulated for the remainder of said period, means for cyclically varying the slope of the directionally transmitted beam, means for modulating said beam by a tone whose pitch varies as a function of the slope, and means responsive to modulations of the directional beam for forming a banded image pattern the bands of which are of contrasting shades and tilted at an angle which is a function of the angle of slope of said beam.

7. In a television receiver, means responsive to omni-directional signals for forming a partial image of intelligence-bearing significance, means responsive to modulated beam-directed signals for completing said image, said beam-directed signals being modulated by different low frequencies as the beam itself is caused to be tilted at different angles in a vertical plane, and a scanning synchronizer having a frequency constant which bears a suitable relation to the modulation frequencies of said beam-directed signals for causing shaded bands to be imaged, the slope of said bands corresponding with the slope of said beam.

ROLAND JOHN KEMP.